N. S. MONROE.
DRAG.
APPLICATION FILED JULY 17, 1913.
1,176,591.
Patented Mar. 21, 1916.
2 SHEETS—SHEET 1.
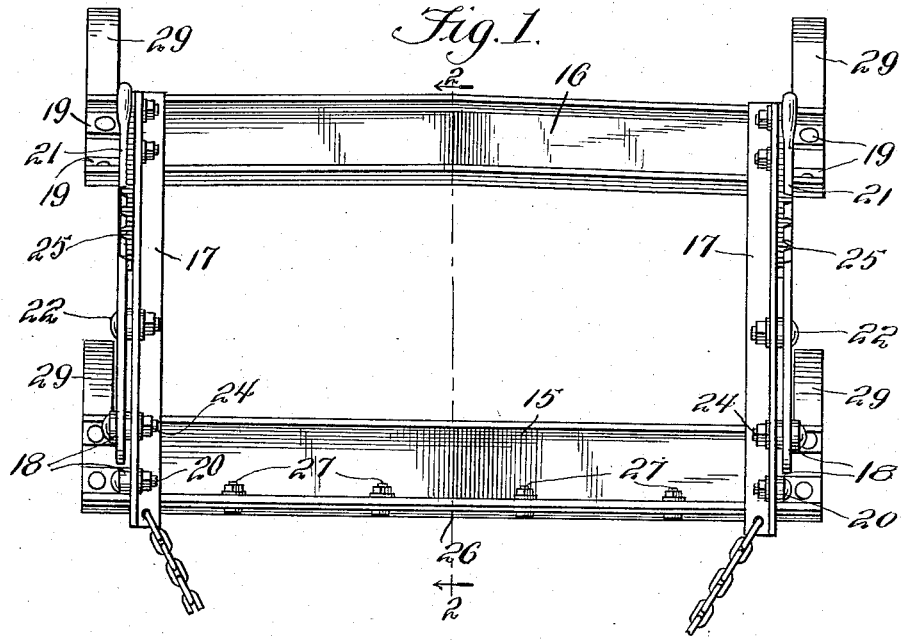
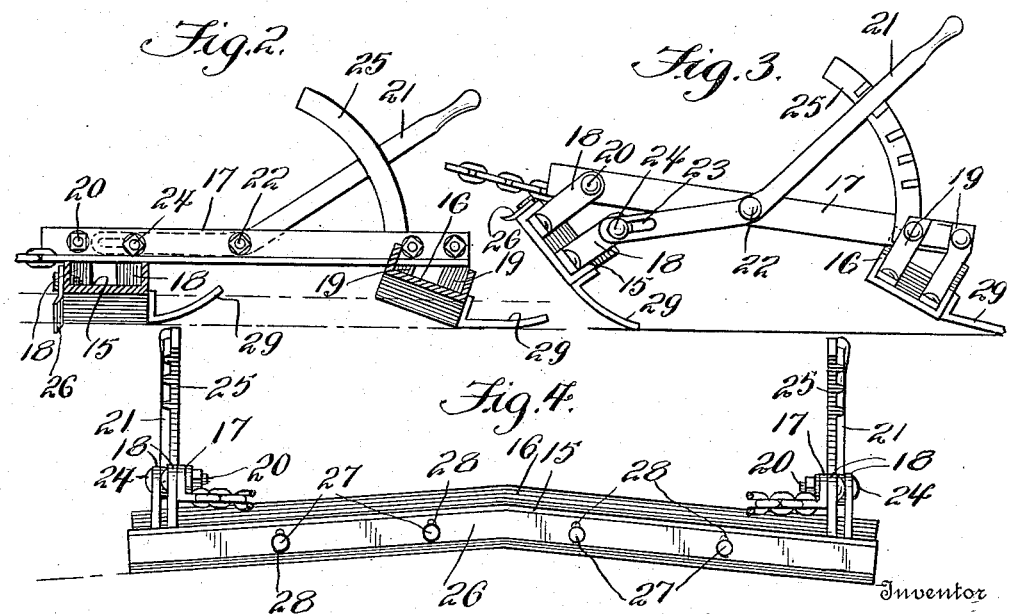
Witnesses
J. T. L. Wright
H. Hough
Inventor
Nathaniel S. Monroe
By
Attorney N. S. MONROE.
DRAG.
APPLICATION FILED JULY 17, 1913.
1,176,591.
Patented Mar. 21, 1916.
2 SHEETS—SHEET 2.
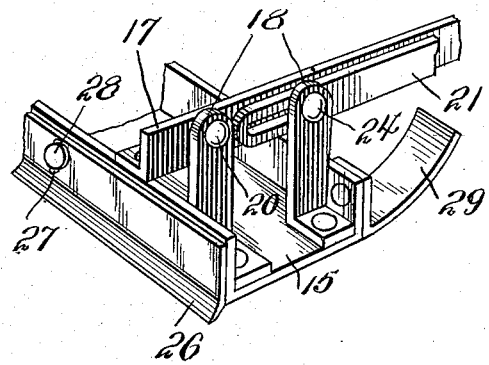
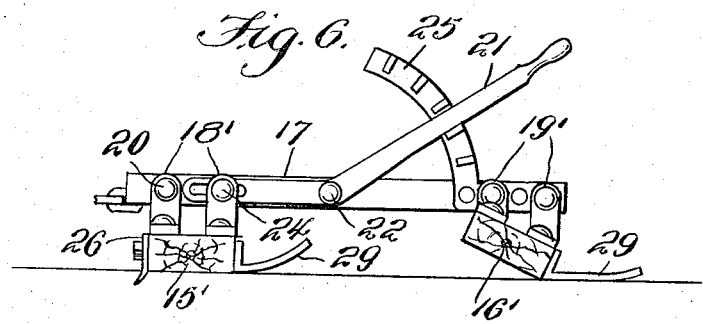
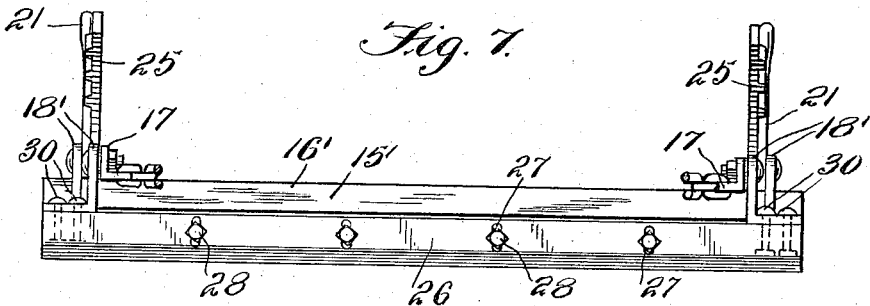
Witnesses
Inventor
Nathaniel S. Monroe
By
Attorney

UNITED STATES PATENT OFFICE.

NATHANIEL S. MONROE, OF ARTHUR, ILLINOIS.

DRAG.

1,176,591.  Specification of Letters Patent.  Patented Mar. 21, 1916.

Application filed July 17, 1913. Serial No. 779,440.

*To all whom it may concern:*

Be it known that I, NATHANIEL S. MONROE, a citizen of the United States, residing at Arthur, in the county of Douglas and State of Illinois, have invented certain new and useful Improvements in Drags, of which the following is a specification.

This invention relates to drags adapted to be used independently or in connection with road scraping and leveling machines of various types, such, for instance, as the one shown and described in Letters Patent No. 1,015,820, issued to me on the 30th day of January, 1912.

One object of the invention is to produce a simple and efficient drag including a scraper whereby the surface of the road operated upon will be leveled, surplus dirt moved into ruts and depressions, and the road surface be packed and compacted.

A further object of the invention is to produce a drag of simple and improved construction including a pivotally supported drag bar carrying a scraper and which may be variously adjusted with respect to the surface of the ground and retained at the most effective angle to operate successfully under existing conditions.

A further object of the invention is to produce a simple and effective drag which in its preferred embodiment is constructed mainly of metallic channel- and angle-bars.

A further object of the invention is to produce a simple and effective drag which may be readily drawn over the surface of the ground to transport it from one place to another, the drag bars being provided with rearwardly extending shoes or runners.

A further object of the invention is to produce a simple and effective construction whereby two drag bars both connected with superposed frame bars may be simultaneously tilted to present their ground engaging faces in a more or less downwardly and rearwardly inclined position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view showing a preferred form of the improved drag with the drag bars in position for operation. Fig. 2 is a longitudinal sectional view taken on the line 2—2 in Fig. 1. Fig. 3 is a view in side elevation, showing the drag bars in position for traveling. Fig. 4 is a front elevation. Fig. 5 is a perspective detail view showing one end of the drag to illustrate the manner of constructing and assembling the same. Fig. 6 is a side view illustrating a modified construction. Fig. 7 is a front view of the said modified construction.

Corresponding parts in the several figures are denoted by like characters of reference.

The improved drag in its preferred embodiment comprises front and rear bars 15, 16, said bars being of substantially rectangular cross section, and it being understood that this definition is intended to include channel bars, as plainly seen in Figs. 1, 2, 3 and 5, where said front and rear bars have been shown as each consisting of a channel-bar of iron or steel and of suitable dimensions to give it the requisite weight. Each of said channel-bars is, moreover, of a width considerably exceeding the height thereof. Channel-bars having a width of twelve inches and with upstanding flanges four inches in height may be deemed properly proportioned for the purposes of the invention, but no limitation is made or intended beyond this that the width should materially exceed the height of the bar so as to form a broad supporting base. Sometimes the drag bars may be bent or shaped to present shallow inverted V-shaped recesses in the undersides thereof, as will be best seen in Fig. 4; this construction being preferably employed when the drag is to be used for crowning roads. When the drag is to be used for other purposes the bars may be permitted to remain straight and flat on their undersides.

For the purpose of connecting the front and rear drag bars together longitudinal frame bars 17 are employed; in the illustration these frame bars have been shown as consisting of L-shaped angle bars. For the purpose of connecting the frame bars 17 with the front and rear drag-bars, the said drag-bars may be provided with angle lugs 18, 19, bolted or otherwise secured thereto adjacent to the ends thereof. The angle lugs 19 of the rear drag bar 16 are bolted upon the angle-bars 17 in such a manner as to support the said rear bar in a downwardly and rearwardly tilted or inclined position with respect to the frame bar 17, assuming the latter to be horizontally disposed; the lugs 18 adjacent to the front portion of the front bar 15 are connected with the frame bars 17 by pivot members 20, enabling said front bar to be tilted to various positions with respect to the frame bars. For the purpose of enabling the front bar to be tilted to various positions with respect to the frame bars 17, levers 21 are fulcrumed on the said frame bars by means of pivot members 22; said levers have forwardly extending arms provided with slots 23 engaging pivot members 24 on the lugs 18 adjacent to the rear portion of the front drag bar, which latter by means of said levers may be readily tilted about the axis of the pivot members 20. For the purpose of retaining the levers 21 to secure the drag bar 15 in adjusted position, arcuate rack bars 25 may be provided, said rack bars being secured on the frame bars 17 or on the rear drag bar in any convenient position. The inherent resiliency of the levers or of the rack bars or of both may be depended upon to retain the parts properly assembled when the levers are shifted from one notch to another.

It will be understood that while two levers have been shown, one at each side of the drag, a single lever may be found sufficient to effect the desired adjustment. In such event, the frame bars 17 may be positioned at or near the medial longitudinal line of the drag, as will be readily understood, in order that excessive strain may be avoided.

Mounted upon the front upstanding flange of the forward drag bar 15 is a scraper blade 26, said scraper blade being preferably supported for vertical adjustment by means of bolts 27 engaging vertical slots 28 therein in order that the scraping edge may be adjusted vertically with respect to the drag bar. Each of the drag bars is provided adjacent to the ends thereof with rearwardly extending narrow shoes or runners 29 on which, when sufficiently tilted, the said drag bars will be supported for transportation from place to place.

It will be seen that while the rear drag bar 16 always occupies a tilted position with respect to the surface of the ground, the front drag bar may be supported in a horizontal position or at various inclinations to enable the scraper blade to bite into the ground to the desired extent. The result of the operation of the machine when dragged over the ground with the scraper blade in ground engaging position will be for the scraper blade to shave off the surface material which, in endeavoring to escape, will serve to fill up ruts and depressions; as the material passes beneath the scraper, the gradual incline of the drag bar which has been adjusted to the most effective position will enable said drag bar to effectively crush the clods and level the surface which is finally smoothed and compacted by the action of the rear drag bar.

The runners 29 extend rearwardly from the drag bars adjacent to the ends of the latter. It will be seen that when the lever 21 is actuated for the purpose of tilting the front drag bar, the latter will rock on the runners 29, and its forward portion will be lifted, thereby lifting the forward ends of the frame bars 17 with which the rearward drag bar is rigidly connected, and thus tipping or tilting the said rearward drag bar on its runners 29, the tilting motion of the two drag bars being substantially the same. Proper adjustment may thus be effected, not only to tilt the two drag bars to the most effective working position, but by continuing the tilting movement the said drag bars may be both lifted bodily from the ground, together with the superposed frame and be supported on the runners alone for convenient transportation from place to place.

It will be particularly noticed that in this implement the front and rear drag bars, when adjustment is made, will both be tilted in the same direction. This is due to the fact that the longitudinal frame bars are rigidly connected with the rear drag bar, said longitudinal frame bars being pivotally connected with the forward portion of the front drag bar. Hence, when the latter is tilted to throw its forward portion in an upward direction, the forward ends of the longitudinal frame bars are lifted, thereby tilting the forward portion of the rear drag bar in an upward direction. This is extremely important in order that both drag bars may be maintained with their forward portions tilted upwardly so that the ground engaging lower faces of both drag bars may act with a smoothing or troweling action with respect to the surface of the ground.

While in the preferred construction of this device, metallic channel-bars are utilized for the drag bars, no limitation is intended in this respect, and in Figs. 6 and 7 the drag bars have been shown as consisting of ordinary planks of suitable dimensions; it being still understood that the width of the drag bars is to be materially in excess of the height. In this form of embodiment of the invention, the frame bars 17, which have still been shown as consisting of angle-bars, may be connected with lugs, here designated by 18' and 19', which are secured on the drag bars, here designated by 15' and 16', by means of screws or bolts 30. The drag bars have been shown as having straight flat under faces, but the construction is in other respects similar to that previously described. It may also here be stated that the angle lugs 18, 19, 18' and 19' which have been shown in the various forms of the invention for the purpose of connecting and assembling the parts may be replaced by other forms of connecting members without departing from the scope of the invention.

The improved drag in its various forms has been found to be extremely useful and serviceable for the purpose of scraping and leveling roads in connection with road leveling machines of the type referred to at the outset of the specification. The drag has also been found extremely useful as a leveler and clod crusher for general purposes. The construction is simple, and the device is thoroughly efficient for the purposes for which it is intended.

Having thus described the invention, what is claimed as new, is:—

1. A device of the class described including front and rear drag bars of substantially rectangular cross section and having flat relatively wide bottom faces, superposed longitudinal frame bars with which the rear drag bar is fixedly connected, and means pivotally connecting the frame bars with the forward drag bar above and adjacent to the front face of said bar; and a blade mounted on the front face of the front bar and projecting below and at an angle to the bottom face of said bar.

2. A device of the class described including front and rear drag bars of substantially rectangular cross section and having flat relatively wide bottom faces, superposed longitudinal frame bars with which the one drag bar is movably connected and with which the other drag bar is fixedly connected, the means movably connecting the frame bars with the one drag bar being positioned above and adjacent to the front face of such bar, and means for upwardly tilting the front portion of the one drag bar from its normal position substantially at right angles to the surface of the ground, to produce a lifting motion on the forward portion of the other drag bar through the medium of the frame bars.

3. In a device of the class described, front and rear drag bars of substantially rectangular cross section, said bars having flat relatively wide bottom faces, and each having rearwardly extending runners adjacent to the ends thereof, superposed frame bars with which the rearward drag bar is fixedly connected, pivotal connecting means between the frame bars and the forward drag bar, the axis of the pivot means being located above and adjacent to the front face of the forward drag bar, and means whereby the forward drag bar may be tilted with respect to the frame bars and secured at various adjustments.

4. In a device of the class described, front and rear drag bars each having rearwardly extending runners adjacent to the ends thereof, superposed frame bars with which the rearward drag bar is fixedly connected, means for pivotally connecting the frame bars with the front drag bar above and adjacent to the front face thereof, and means whereby the forward drag bar may be tilted to produce a corresponding tilting movement of the rearward drag bar through the medium of the frame bars.

5. In a device of the class described, front and rear drag bars, each provided with rearwardly extending runners adjacent to the ends thereof and each having upwardly extending lugs adjacent to their forward and rearward portions, superposed frame bars rigidly connected with the lugs of the rearward connecting bar to maintain the latter with its bottom face in a downwardly and rearwardly inclined position, pivot members connecting the frame bars with the upstanding lugs adjacent to the forward portion of the front drag bar, and tilting means including a lever fulcrumed on a frame bar and having a forwardly extending slotted arm, and a pivot member on a lug adjacent to the rearward portion of the front drag bar in engagement with the slot.

6. In a drag, front and rear drag bars consisting of channel-bars having relatively wide bases and upstanding front and rear flanges, angle lugs secured adjacent to the ends of the drag bars, frame bars consisting of angle-bars extending lengthwise across the drag bars, means connecting the frame bars with the upstanding lugs of the rear drag bar to support the latter in a downwardly and rearwardly inclined position, pivot members connecting the frame bars with the angle lugs secured on the front upstanding flange of the forward drag bar, levers fulcrumed on the frame bars and having forwardly extending slotted arms pivotally connected with the angle lugs secured on the rear flange of the front drag bar, and means for securing the levers at various adjustments.

7. A device of the class described including front and rear drag bars of substantially rectangular cross section and having flat relatively wide bottom faces, superposed longitudinal frame bars with which one drag bar is fixedly connected, pivot means connecting the longitudinal frame bars with the other drag bar, and means for effecting a tilting movement of the last mentioned drag bar with respect to the longitudinal frame bars, said pivot means being so arranged that tilting movement of the pivotally connected drag bar will produce a corresponding tilting movement of the fixedly connected drag bar; one of said drag bars having on its front face a blade that projects below and at an angle to the bottom face of said bar.

In testimony whereof I affix my signature in presence of two witnesses.

NATHANIEL S. MONROE.

Witnesses:
E. W. BOYD,
JAMES E. MORRIS.